United States Patent
Lackey et al.

(10) Patent No.: US 7,844,622 B1
(45) Date of Patent: Nov. 30, 2010

(54) SYSTEM AND METHOD FOR MAINTAINING A PRODUCT SPECIFICATION WITHIN REGIONAL PARAMETERS WHEN SELECTING OPTIONS

(75) Inventors: Rachael Lackey, Wichita, KS (US); Renee Cassil, Newton, KS (US); Julie Ramsey, Wichita, KS (US); Lannie O'Bannion, Wichita, KS (US); Angela Grimes, Andover, KS (US); Dewitt Phillips, Haysville, KS (US); Larry Van Dyke, Wichita, KS (US); Dan McPartland, Wichita, KS (US)

(73) Assignee: Cessna Aircraft Company, Wichita, KS (US)

( * ) Notice: Subject to any disclaimer, the term of this patent is extended or adjusted under 35 U.S.C. 154(b) by 179 days.

(21) Appl. No.: 11/566,522

(22) Filed: Dec. 4, 2006

(51) Int. Cl.
- *G06F 7/00* (2006.01)
- *G06F 17/30* (2006.01)
- *G06F 9/44* (2006.01)
- *G06F 17/00* (2006.01)

(52) U.S. Cl. ............... 707/769; 707/754; 707/736; 717/120; 715/201

(58) Field of Classification Search ............ 703/13; 706/47

See application file for complete search history.

(56) References Cited

U.S. PATENT DOCUMENTS

| | | | |
|---|---|---|---|
| 6,035,305 A | 3/2000 | Strevey et al. | |
| 6,718,361 B1 * | 4/2004 | Basani et al. | 709/201 |
| 6,810,401 B1 * | 10/2004 | Thompson et al. | 707/101 |
| 6,895,291 B2 | 5/2005 | Arnaud et al. | |
| 6,922,674 B1 | 7/2005 | Nelson | |
| 7,031,941 B2 * | 4/2006 | Garrow et al. | 705/50 |
| 7,200,583 B1 * | 4/2007 | Shah et al. | 706/47 |
| 2001/0018669 A1 | 8/2001 | Fujiwara | |
| 2002/0099628 A1 | 7/2002 | Takaoka et al. | |
| 2002/0128933 A1 | 9/2002 | Day et al. | |
| 2002/0178080 A1 | 11/2002 | Ly et al. | |
| 2003/0055674 A1 | 3/2003 | Nishiyama | |
| 2003/0061058 A1 * | 3/2003 | Dutta et al. | 705/1 |
| 2003/0065571 A1 | 4/2003 | Dutta | |
| 2003/0172003 A1 | 9/2003 | Holbrook et al. | |
| 2003/0187753 A1 | 10/2003 | Takaoka | |
| 2005/0010539 A1 | 1/2005 | Zwicker et al. | |
| 2006/0089920 A1 | 4/2006 | Ramesh et al. | |

\* cited by examiner

*Primary Examiner*—Tony Mahmoudi
*Assistant Examiner*—Paul Kim
(74) *Attorney, Agent, or Firm*—Lanthrop & Gage LLP

(57) ABSTRACT

Disclosed is a method of computer generating a product specification. The specification is dependent on the selection of a number of options by a consumer. The method utilizes a computer program which receives from user a location in which said product will be used. After that, the user is allowed to select product options. Information regarding rules and regulations for that particular location is made available from separately identified data files on a server. Options required in that particular locations will be automatically added to the specification. When additional options are selected, the program determines whether the product is still in compliance in the location selected. If the added option results in the specification running afoul of a regional rule or regulation, the user will be notified, and advised as to how the violation can be overcome. Once the user is satisfied with the options, and these options are in compliance, the specification is completed and useful for making an order.

11 Claims, 3 Drawing Sheets

SPEC TOOL

1. IN WHAT COUNTRY WILL YOUR AIRCRAFT BE REGISTERED?
   [ALBANIA ▼] ~302

2. WHAT WILL BE YOUR TYPE OF OPERATION?
   [PRIVATE ▼] ~304

3. IN WHAT REGIONS WILL YOUR AIRCRAFT OPERATE?

306~
   ```
   AFRICA
   ASIA
   ATLANTIC
   AUSTRALIA
   CARRIBEAN
   CENTRAL AMERICA
   EUROPE
   MIDDLE EAST
   NORTH AMERICA
   PACIFIC
   SOUTH AMERICA
   OTHER
   ```

310

4. NUMBER OF PILOTS?
   [1 ▼] ~308

ESTIMATED OPTIONS PRICE: [$99,550.00] ~312   ESTIMATED OPTIONS WEIGHT: [36.60 lbs] ~314

*FIG. 3.*

SYSTEM AND METHOD FOR MAINTAINING A PRODUCT SPECIFICATION WITHIN REGIONAL PARAMETERS WHEN SELECTING OPTIONS

BACKGROUND

1. Field of the Invention

The disclosures of this application relate generally to methods of offering goods for sale. More specifically, this application is directed to the field of the sales of products upon which regional restrictions are placed.

2. Description of the Related Art

Systems and methods for automatically configuring and pricing products have been in existence for many years. Normally, some sort of computing arrangement—either simple or complex—has been used. Some of these conventional systems are adapted to automatically display prices, and in some instances are able to concurrently calculate a total product price as the product is being configured. Where the particular product has a plurality of possible options which affect price, systems have been developed which will properly adjust the price when different options are selected and deselected by a customer.

Other systems have been developed which will automatically display the impact the options have on dimensions and other variables. Other systems enable the user to select options while a three-dimensional representation of the resulting product is displayed.

These conventional systems have proved useful in many respects, but have their limitations. One limiting aspect, is that the prior art systems do not account for location-specific requirements. Using the aircraft industry as an example, different countries have different rules when it comes to offering an aircraft as a product. An aircraft seller may have numerous options it can provide. But different countries will require or ban some options because of native rules, regulations, and other location-based dictates. Because these dictates are not factored into the prior art automated product specification development processes, these processes, if used for products having regional requirements, will result in a noncompliant product. Dealing with the noncompliance can be overcome by adding further manual checks and balances to the process, e.g., having staff amend the automated specification after identifying the reason for noncompliance. But this adds significant time to the process as well as the likelihood of human error. And the customer may become frustrated with the additions of changes after already settling on a product configuration.

Because the prior art processes are not adapted to accommodate foreign regional rules, an otherwise seamless process is interrupted. Therefore, there is a need in the art for an automated process which is able to create a product specification which also adequately accommodates regional requirements.

SUMMARY

The disclosed invention overcomes the needs expressed by providing a method of computer generating a product specification for a user. The method includes the steps of receiving a location in which the product will be used, and then determining whether an action regarding product options causes them to be in compliance. This is done by referencing a data file which includes information regarding regionally-specific requirements in the location at issue. A process then informs the user of whether said action causes said product to be in compliance.

In order to receive the location selection from the user by presenting the user with a field on a computer generated screen for entering the location. In one embodiment the product is an aircraft, but specifications for numerous other products could be generated using these processes. Especially where those products are subjected to geographically-sensitive rules and regulations. In another embodiment, the process receives the region in which the product is to be certified and assesses whether the product complies with the rules in the region. In yet another embodiment, the method automatically determines whether the action regarding said product option results in the violation of a rule in that particular location. Where this is the case, the method will then notify the user of the rule violation, and, in some embodiments, even suggest solutions available to avoid violating the rule. Where the option is mandatory in a particular region, another process is able to automatically add the required option to the specification.

A system is also provided. This system enables the generation of a product specification where the product has different option requirements in different locations. The system includes a first computing device adapted to access data files. Some of the data files include information regarding at least one rule in a particular regional location. A first process running on the first computing device is adapted to receive a location for product use from a user. A second process running on the first computing device is adapted to present a list of options to the user. This enables the user to either select or deselect each of the options. A third process running on the first computing device is adapted to determine if the option selections are in violation of the rule. A fourth process notifies the user of any rules violations and suggests solutions.

In another embodiment, a fifth process running on the first computing device is adapted to generate a graphical display of a specification for the product. This display includes a representation of all the options currently selected. In another embodiment, the product is an aircraft.

In yet another aspect, a method of generating a product specification includes maintaining data files for each of a plurality of geographic locations. Each data file includes information regarding geographically-specific product requirements for one of said plurality of the locations. Access is then allowed to the data files for the purpose of creating a product specification which is geographically compliant.

In another embodiment, a front end server is used to accomplish the above-referenced maintaining step, and a back end server is provided to test the data files against an administratively operated specification development tool. The data files are then published to the first server for end use.

BRIEF DESCRIPTION OF THE DRAWINGS

FIG. 3 illustrates one embodiment for a computer generated interface useable for receiving and displaying information in accomplishing the processes of the disclosed methods.

DETAILED DESCRIPTION

Figure 1:
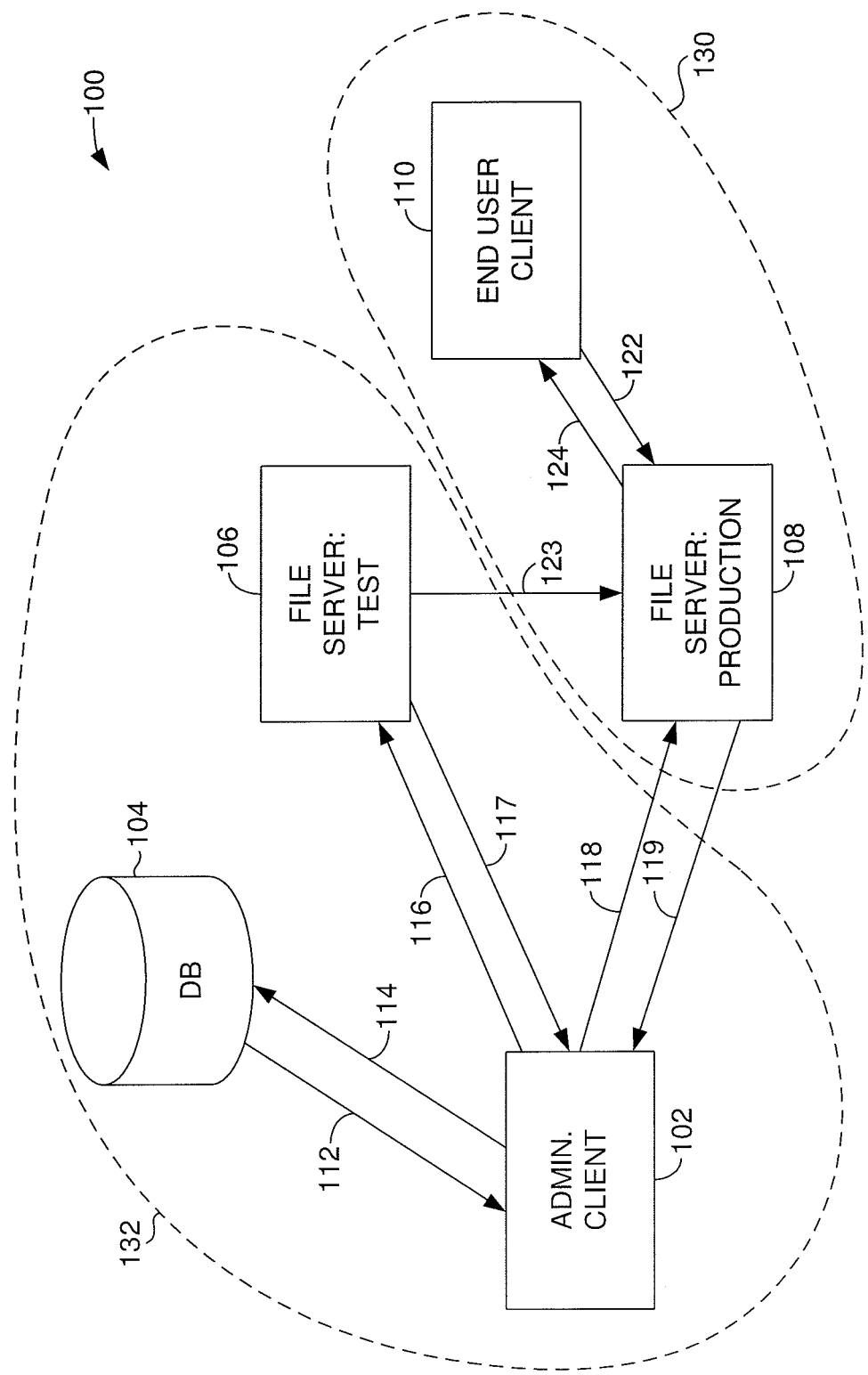
FIG. 1 illustrates a system diagram for a computing environment in which one embodiment of the disclosed processes could be performed.

The disclosed systems and methods for developing a product specification enable the user to overcome obstacles encountered when marketing products which are subject to regionally based requirements such as required options, material bans, weight maximums, and other restrictions due to local rules and regulations. In order to overcome these hurdles, a specification tool has been developed which is able to automatically account for these restrictions, and enable the user to easily develop a product that is fully compliant in all of its regions of intended certification or use.

One area in which the process is especially useful is in the field of aircraft product sales. Using the tool, the user is able to select options for an aircraft knowing all the while that the end product will be fully compliant in the country of certification as well as any regions in which the aircraft is to be operated. Without these processes, the sales person or other user would have to manually check all of the rules and regulations for the certification location as well as all locations of intended use after the customer has already selected options. Where the options selected do not match up with the regional requirements, the customer is again dragged through the whole specification creation process again to create a product that conforms. This adds great time and frustration to the process of developing a valid product specification.

The process avoids these problems using the systems and methods described below. Unless otherwise specified, any terms used herein should be interpreted broadly and liberally to the extent allowed by the art and the meaning of the words offered in context.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 2:
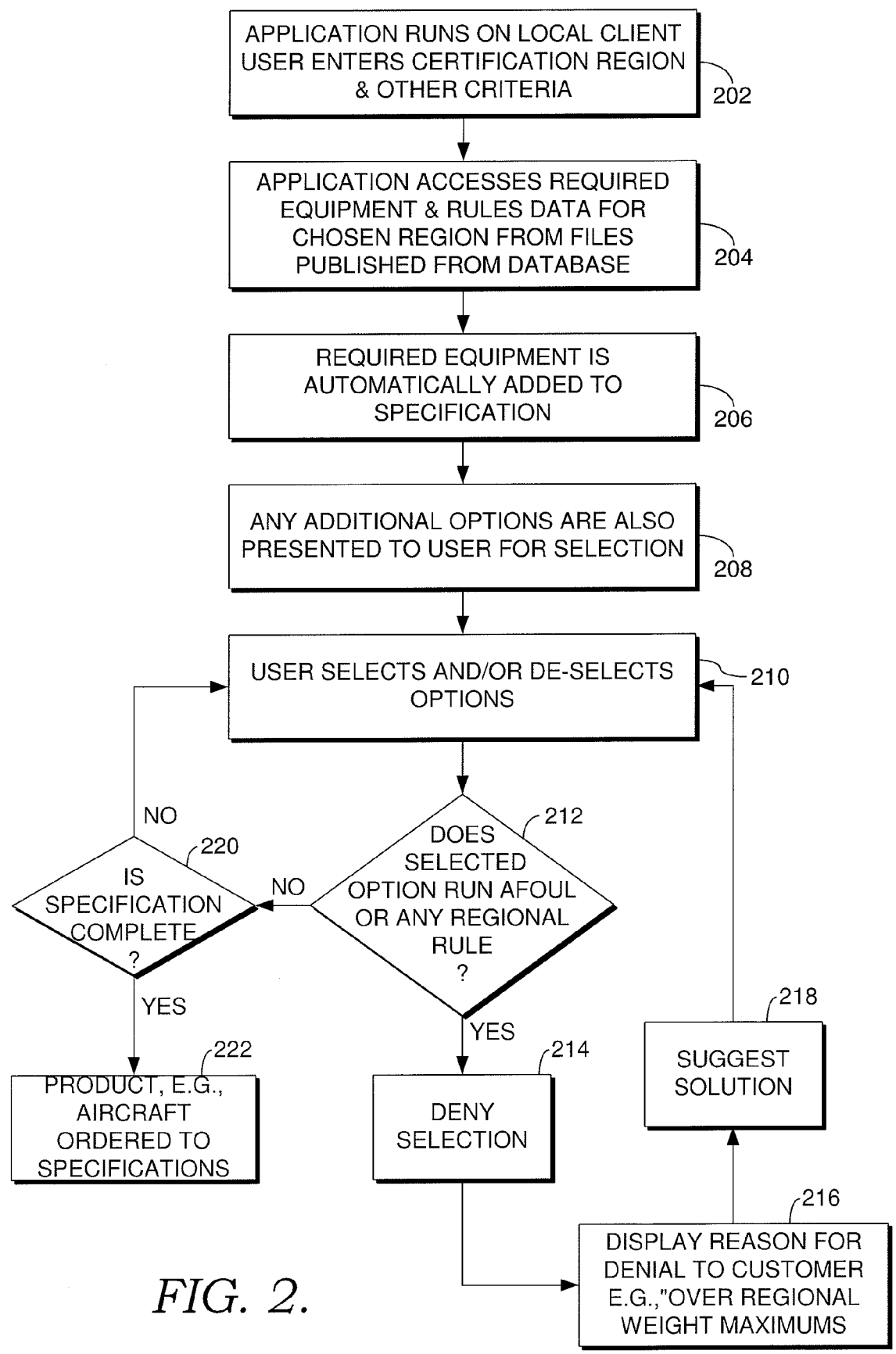
FIG. 2 illustrates a process flow diagram for one embodiment of the processes of the specification tool of the present invention.

An embodiment of the present invention is shown in FIGS. 1-3. Referring first to FIG. 1, a system 100 includes a front end 130 and a back end 132. Back end 132 comprises an administrative client 102, a database 104, and a file server 106 which is used for testing. Front end 130 comprises a production file server 108 and an end user client 110. In the preferred embodiment, administrative client 102 and end user client 104 are personal computing devices. One skilled in the art, however, will recognize that numerous other computing devices could be used instead and still accomplish the same objectives and thus still fall within the scope of the disclosed invention. Database 104 can exist anywhere and take one of many physical forms. Here, it is maintained in memory on a larger computing device, e.g., a database server. But this should not in any way be considered a limitation of the broad aspects of the present invention. Test server 106 and production server 108, in the preferred embodiment, are larger computing devices than clients 102 and 104. But like with the other computing devices used in the preferred embodiment shown in FIG. 1, numerous other computing devices could be used and still fall within the scope of the present invention.

In terms of communications between the many components, a line of communications 112 to and a line of communications 114 from database 104 are available to administrative client 102. Numerous administrative processes are running on administrative client 102. These processes, all which fall within what is known to one skilled in the art will be used to accomplish the functional objectives necessary to the specification tool. Administrative client 102 is also provided with a line of communications 116 to and a line of communications 117 from test server 106. Similarly, lines of communications 118 and 119 are provided to and from production server 108 from administrative client 102. A line of communications 123 is used as an avenue for publication from test server 106 to production server 108. End user client 110 is able to communicate with production server 108 using a send line of communications 122 and a return line of communications 124. The physical embodiment selected for establishing lines of communications 112, 114, 116, 117, 118, 119, 122, 123, and 124 is not critical to the invention. Each could be some form of physical conduit, e.g., an Ethernet connection, some form of general local area network connection, or, most likely include both. The arrangement could also include connecting over an intranet or the internet, though not shown in FIG. 1. One skilled in the art will recognize that numerous arrangements for establishing the FIG. 1 communications connections are possible, and that the precise arrangement is not critical to the invention.

As a preliminary to performing the desired specification creation processes, administrative computing processes running on administrative client 102 are used, at the direction of an administrator, to build extensive product information into database 104 using lines of communications 112 and 114. In the preferred embodiment, this information will include, i.e., information enabling the three-dimensional representations of the product, data enabling the three-dimensional removal and addition of particular product options, and the weights and other properties of the product and its options.

The information will also include regional information. This regional information includes regional rules and restrictions relating to the product. In the preferred embodiment, these rules and restrictions will be organized into separate directories, or catalogues of files based on region. For example, one or more files including rules and restrictions relating to the product in Canada might be maintained on database 104 in one set of files in one directory, whereas a separate group of files including the rules and restrictions in the United States would be maintained in a separate directory on database 104. Likewise, other directories would include groups of files might regarding the rules and restrictions in France, Germany, and all other relevant countries. That said, in building the database, the files for the separate regions are created and maintained in a matter in which they can be separately accessed for modification and/or use by administrative client 102. For example, saved in separate directories and catalogued.

Before being released to production server 108, a plurality of test files including updated regional data as well as other data files (e.g., 3-D product images) are all accessed by a computer process running on client 102 and then published to test server 106. The regional information is maintained in separate files. For each location (e.g., by country, state, or other geographic indication), one or a group of files will be maintained on test server 106 under some identifier which makes the files separately retrievable. This will be the case for all of the different groups of files for each of the different locations.

Server 106 is not visible to users on one or more clients 110, but is visible and accessible to administrative client 102 via lines of communications 116 and 117. Once the test files are received, a computer process ("the specification tool") running on administrative client 102 will cause the data files to be tested for performance. Details regarding the specification tool will be discussed in more detail below (see also FIG. 2).

Next, a specification tool process running on administrative client 102 (which is substantially identical to the one described in FIG. 2) is used to test the data files. The overall application will be reviewed for proper functionality using lines of communication 118 and 119. Thus, lines of communication 118 and 119 give an administrator on client 102 visibility of production server 108 in order to observe what is happening with the released version.

The back end 132 is used to support and update files published to front end production server 108. Production server 108 is used to support one or more clients like end user client 110 so that the processes of the present invention may be accomplished. Once the testing user determines that the version loaded on test server 106 is in acceptable condition for release, the data files will be published to production server 108 via line of communications 123, and the tool is ready for use by a user on client 110. Now that the desired version now loaded onto production server 108, the separately identifiable data files containing separate rules-and-regulation information regarding each of the locations is available in published form and can be accessed by a user on client 110. In the preferred embodiment, this is accomplished by causing the latest published regional information datafiles to be downloaded from production server 108 to client 110 when the user starts up the specification tool on client 110. The process is then able to be used in accomplishing the objectives of generating a product specifications for customers using the specification tool processes.

Use of the terms "specification tool" to describe the processes of the current invention should not be considered in any limiting sense. These terms do not denote any particular method, system, or computer-program product, and could include any means utilized to accomplish the broad objectives expressed herein.

The specification development tool is run in two different locations in the FIG. 1 schematic. When in the testing phase of the development process (discussed above) the tool is run on administrative client 102. But the tool is also run on end user client 110 when ultimately used for its intended purpose—product ordering and sales. In order to avoid unnecessary duplicity, the specification tool is described below as it is used on end user client 110. But it should be understood that these substantially same processes are used during testing on administrative client 102 which have been described above.

The details regarding the specification tool are disclosed in a flow-diagram 200 shown in FIG. 2. Referring to the figure, it can be seen that it is presumed that the specification tool process is already running on end user client 110. This ensured, the user enters the region in which the product is to be used and other criteria. Using an aircraft as an example product, this step might involve a user entering (i) the country in which the aircraft is to be registered; (ii) a description of the operation, (iii) a listing of the regions in which the product aircraft will be operated; and (iv) the number of pilots needed, into fields on a computer screen generated on client 110 like the one shown in FIG. 3.

The screen shot of FIG. 3 is generated by the specification tool running on end user client 110 when in service, or on administrative client 102 when the tool is being tested. Referring to FIG. 3 in more detail, the screen shot shows one embodiment for a computer generated data entry screen having numerous fields. A first field 302 includes a drop down menu including options for the country in which the product (aircraft) is to be registered. Though only "Albania" is shown in FIG. 3, it should be understood that this menu would include all countries in which an aircraft might be registered. The user is allowed to select one country for registration. The particular selection here will be relevant to the specification tool, which will use the information against the data files on the production server to make sure the aircraft specification being created is within the parameters of what is acceptable in that particular country.

In order to complete the screen, the user must also select the type of operation in a drop down menu 304. Though only "Private" is shown in FIG. 3, clicking on the drop down menu also reveals other options of "Commercial," "Fractional," and "Government." One skilled in the art will recognize that each of these classifications may require different product options and configurations, thus, the specification tool process needs to receive information regarding the intended type of operation in order to ensure a compliant product.

In a next drop down menu 306, the user is able to select one or more regions in which the aircraft/product will be used. The list shown in field 306 is a breakdown of different locales that have differing rules and requirements for aircraft. One or more of these regions can be selected if it is likely a particular product will be used there. Because each region of operation will have different rules and regulations regarding product configuration, it is necessary for the specification tool to receive this information. Without it, a product specification will likely result. Because the specification tool collects this information, however, the product specification will result in a product, e.g., an aircraft, that will be useable in the particular regions selected. Although the disclosed FIG. 3 embodiment lists Africa, Asia, Atlantic, Australia, Caribbean, Central America, Europe, Middle East, North America, Pacific, South America, and "Other" as options, one skilled in the art will recognize that this list could be altered to suit the interests of the user. Further, events in the future may lead to different geographical breakdowns in terms of locales that have divergent rules and regulations for aircraft.

The final required field of entry in the FIG. 3 screen shot is an inquiry as to the number of pilots required for operation. One skilled in the art will recognize that different aircraft may require different numbers of pilots (e.g., one or two) depending on the circumstances. And the number of pilots will effect the typical aircraft specifications (e.g., a single pilot cockpit will require only one oxygen mask, whereas a dual pilot arrangement will require two. Therefore, the specification tool is adapted to receive the number of pilots in order to assure compliance.

Although each of menus 302, 304, 306, and 308 identify particular options for selection, it should be understood that numerous other menus could be set up to receive different information necessary to create a location-compliant product depending on the circumstances. For example, were the product to be something different than an aircraft, (e.g., watercraft) very different regional inquiries might be required (e.g., body of water in which use is intended, saltwater versus freshwater use). Therefore, the broad aspects of the present invention should not be limited to any particular menu arrangement or to any particular product (e.g., aircraft).

Referring now to the point in FIG. 2 at which we left off, a next step 204 involves the step 202 use of the information received using the FIG. 3 menus. Referring back to the FIG. 1 arrangement, the regional data files are downloaded from production server 108 onto client 110 upon the opening of the application if the user so chooses. The user is given the option, upon starting up the application, to either synchronize the data files with the current version on server 108 or not. Once downloaded onto client 110, the rules data is useable by the specification tool. Based on the information received from the user, the specification tool accesses from the data files which have been downloaded onto client 110 from server 108 when the application is started up the required equipment and rules data for a product being registered in the country selected in field 302, with a type of operation entered into field 304, operated in the countries selected in field 306, and accommodating the number of pilots specified in field 308. More specifically, the entry of registration in a particular country using field 302 in FIG. 3, e.g., USA, will cause the specification tool to pull up a correspondingly identified data files which have previously been loaded onto client 110 from production server 108. The appropriate file (or group of files) is identified by an identifier (e.g., catalogue/directory) and will include all the necessary equipment and rules requirements for the United States.

The specification tool accesses the regional information to determine how to configure the product/aircraft. For example, if the United States, unlike other global regions, requires an extra oxygen mask for all planes registered, this information will be included in the U.S.A. data file on server 108 and could be pulled up. Thus, the specification tool running on client 110 can identify the mask requirement, and act accordingly. Similarly, if any plane operated in the United States (but not registered here) requires special engine mounts, this too will be recognized by the specification tool.

The regionally organized data files also include any special rules information relevant to the particular countries or locations of operation. For example, Europe may have a lighter overall craft weight maximum than is typically required. Thus, after a user selects Europe as a location for operation (using field 306 in FIG. 3), the specification tool will be able to call up the abnormally low weight requirement from the European data file (or files) devoted to Europe. Then, if the specification for the product aircraft exceeds these low weight limitations, this will be recognizable by the specification tool.

As already discussed, different regions have numerous rules and regulations affecting aircraft configurations. But step 204 avails a tremendous amount of location-specific requirement data to the specification tool.

In a step 206, the specification tool takes the accessed required equipment received in earlier step 204, and automatically adds these options to the current product specification. For example, if a Canadian rule requires an extra oxygen mask, the specification tool will automatically add this to the aircraft configuration.

With the preferred embodiment, the specification tool also includes a 3-D graphical product display. Referring to FIG. 3, this display occurs on a computer screen generated (not shown). One skilled in the art will recognize that products have been graphically displayed in the past using known processes, and that these processes also have the ability to display the addition and subtraction of particular options from the displayed product. Thus, the options, when added, are included in the product which is three dimensionally displayed in area 310 (actual displayed matter is not shown).

Referring again to step 206, where the particular option is required in the designated locations for (i) certification, or (ii) operation, this option will be automatically included in the product specification displayed. Thus, with the Canadian hypothetical, the oxygen mask would automatically be included in the displayed 3-D aircraft specification.

Once all the required options have been included with the specification in step 206, the process proceeds on to a next step 208. In this step, the specification tool displays a listing of all other options so that the customer may or may not select these options. Although the specification tool automatically selects the options required in the region (or regions) selected for certification and use in step 206, these required features can be deselected if desired. The presentation may be done by presenting menus on one or more computer screens, or in some other manner.

In a next step 210, the user is given the opportunity to select or deselect a list of all the options available for the product. For example, number of seats, storage arrangements, cloth versus leather interior, etc. Further, the options automatically added in step 206 can be deselected if desired. These selections and deselections will be graphically displayed in the 3-D model of the product specification as they are made. For example, if an extra seat is added, that seat will instantly appear in the 3-D product specification displayed.

In addition to the 3-D product option display features, the effect any selected option has on total price and weight can be seen by viewing output fields 312 and 314 respectively. Field 312 lets the user know the total options price for the specified product based on the current options selected. Similarly, field 314 apprises the user of total weight for the current product specification. These fields enable the user to know price and cost at all times during the selection process. This is especially helpful, because the user may have weight and cost limitations apart from what is restricted by local rules and regulations.

Once an option has been selected, the process moves on to a query step 212. In this step, the specification tool determines whether the selection of the option (or deselection) causes the product specification to run afoul of any of the regional rules accessed in step 204. This is accomplished by running a query of the location-specific data files downloaded in step 204. For example, let us again assume that the product/aircraft is to be operated in Europe, and that Europe has unusually stringent weight requirements. Let us also assume that the customer has selected leather interior seats, and that leather seats are significantly heavier than the standard cloth interior materials used. So much so that the addition of the leather option causes the overall craft weight to exceed that allowed in Europe. When the addition of the leather interiors causes the overall craft weight to exceed the European requirements, this will be recognized by the specification tool. The specification tool does this by comparing the current total product weight against the European maximum which is known from the Europe-specific data file (or files).

Once the noncompliant parameter (excessive weight) is recognized, the specification tool will deny the selection made in a step 214, and instantly notify the customer. The notification is accomplished by displaying the reason for denial of the selection made in a step 216. More specifically, the specification tool running on client 110 causes the computer screen to express not only that the selection has resulted in a noncompliant product, but also the reason for the noncompliance, e.g., that the aircraft configuration is currently "over regional weight maximums" as shown in step 216 of FIG. 2.

In order to further assist the user, the specification tool process in a next step 218 displays to the user one or more helpful suggestions which intend to bring the product into compliance in the particular country. For example, the tool might suggest that the user remove other relatively heavy equipment so that the substitution of leather for cloth does not cause the aircraft to exceed the weight ceiling.

By informing the user, e.g., customer or salesperson, of the reason the European rule has been violated, and suggesting possible solutions which might bring the product into compliance, the user, when returned to the selection/deselection step 210, is able to make educated alternative selections which conform the product specifications to the relevant regional rules and regulations.

Where the option selected in step 210 does not run afoul of any regional rule in step 212, the specification tool makes inquiry as to whether the specification is yet complete. The user may want to add or subtract options at that point. Or the user may have completed the selection process. Where the product is in final form, the user can indicate so by either answering an inquiry presented by the specification tool (not shown), or by clicking on an available field presented on screen generated on client 110. Once completion is indicated, the specification tool will then, in a step 222, create a finalized order. This order will be used either automatically or manually for ordering, proposing, or manufacturing a product to the selected specifications which is fully compliant with the rules and regulations of the location in which it is to be used and/or certified.

If the user is not done making selections, a step 220, specification tool process is directed back to step 210 where further changes may be made.

It should be noted, that although an aircraft product has been used above for demonstrative purposes above, the specification tool processes would be equally applicable to numerous other products. Especially where those products are marketed to locations having different rules and regulations for the kind of product involved.

As can be seen, the present invention and its equivalents are well-adapted to provide a new and useful method for automating a process associated with creating a product specification which conforms to regional rules and requirements. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will also be understood that certain features and subcombinations are of utility and may be employed without reference to other features and subcombinations and are contemplated within the scope of the claims. Not all steps listed in the various figures need be carried out in the specific order described.

The invention claimed is:

1. A method of computer generating a product specification for a passenger vehicle product for a user, said method comprising:

presenting a plurality of locations;

receiving a selection of a location from said plurality in which said passenger vehicle product will be operated;

providing an initial product specification of said passenger vehicle product while automatically including any features in said initial product specification if the features are required in the location;

displaying a depiction of the initial product specification;

determining whether an added option regarding a physical feature of the passenger vehicle product would result in an altered product specification which is in compliance in said location by referencing a data file, said data file including information regarding at least one regionally-specific requirement in said location;

displaying a depiction of the altered product specification which includes the added option;

automatically informing said user of whether said added option causes said altered product specification to be in compliance enabling the user to eliminate a formerly-existing physical feature in said specification to result in a remaining specification;

reflecting the removal of the formerly-existing physical feature in a stripped three-dimensional representation of said remaining specification upon the user's elimination of the formerly-existing physical feature;

determining whether the remaining specification is in compliance in said plurality of places the aircraft is intended to be operated;

executing said determining step by referencing the at least one data file or another data file which includes regionally-specific requirements in the plurality of places in which the aircraft is intended to be operated;

automatically displaying an indication of whether the remaining specification is still in compliance; and continually displaying a total weight for the aircraft product.

2. The method of claim 1 wherein said receiving step further comprises providing said user a field on a computer generated screen for entering said location.

3. The method of claim 1 comprising:

selecting an aircraft as said passenger vehicle product.

4. The method of claim 3 comprising:
accepting information from said user regarding a region where said passenger vehicle product is to be certified; and
assessing whether said passenger vehicle product complies with at least one rule required in said region.

5. The method of claim 1 comprising:
suggesting solutions available to avoid violating said rule to said user.

6. The method of claim 1 comprising:
automatically including a required option in said specification wherein said required option is mandatory in said location.

7. A computer system for generating a product specification for an aircraft has different option requirements in different locations, said system comprising:
a first computing device adapted to access a plurality of data files, each file in said plurality of data files including information regarding a plurality of rules in a particular regional location;
a first process running on said first computing device, said process being adapted to receive a location for intended operation of the aircraft from a user;
a second process running on said first computing device, said second process adapted to present a list of physical-feature options to said user enabling said user to take an action of one or both of selecting and deselecting each of said options in concurrently updating said product specification in a manner which can be visualized in a product display;
a third process running on said first computing device, said third process adapted to determine if said action is in violation of at least one rule in the plurality;
a fourth process running on said first computing device, said fourth process being adapted to notify said user if said action is in violation of said at least one rule;
a fifth process running on said computing device, the fifth process enabling the user to eliminate a formerly-existing physical option in said specification to result in a remaining specification;
a sixth process running on said computing device, the sixth process reflecting the removal of the formerly-existing physical option in the vizualized product display upon the user's elimination of the formerly-existing physical feature;
a seventh process running on the computing device, the seventh process determining whether the remaining specification is in compliance in said plurality of places the aircraft is intended to be operated;
executing the seventh process by referencing the plurality of data files which include information regarding the plurality of rules in the particular regional location; and
an eighth process running on the computing device, the eighth process automatically displaying an indication of whether the remaining specification is still in compliance; and
continually displaying a total weight for the aircraft product upon the execution of at least the second, fourth, sixth, and eighth processes.

8. The system of claim 7 comprising:
a second computing device for maintaining a plurality of data file groups, each of said groups including regional rules related to a particular location; each of said groups being optionally accessible by said first computer.

9. The system of claim 7 comprising:
a ninth process running on said first computing device, said ninth process adapted to cause a required option which is necessary for operation in said location to be automatically added to said specification without being specifically selected by said user.

10. A method of computer generating a desired aircraft product specification, said method comprising:
receiving a plurality of places in which the aircraft is intended to be operated;
receiving a location in which said aircraft is to be certified;
receiving whether a mode of operation will be public or private;
generating an initial specification of said aircraft which includes features which are geographically required after consideration of: (i) the plurality of places in which the aircraft is to be operated, (ii) the location in which the aircraft is to be certified, and (iii) the mode of operation for the aircraft by accessing a database which includes certification and operational requirements for said plurality of places in which the aircraft is to be operated and the location in which the aircraft is to be certified;
presenting a three-dimensional representation of said initial specification;
enabling the user to add an additional physical feature to said initial specification to result in an augmented specification;
reflecting said additional physical feature in an augmented three-dimensional representation upon the user's selection of the additional physical feature;
determining whether the augmented product specification is in compliance in said plurality of places the aircraft is intended to be operated;
executing said determining step by referencing at least one data file, said at least one data file including a plurality of regionally-specific requirements in said plurality of places in which the aircraft is intended to be operated; and
automatically displaying whether said additional feature causes said augmented product specification to be in compliance;
enabling the user to eliminate a formerly-existing physical feature in said specification to result in a remaining specification;
reflecting the removal of the formerly-existing physical feature in a stripped three-dimensional representation of said remaining specification upon the user's elimination of the formerly-existing physical feature;
continually displaying a total cost and a total weight for the aircraft product;
determining whether the remaining specification is in compliance in said plurality of places the aircraft is intended to be operated;
executing said determining step by referencing the at least one data file or another data file which includes regionally-specific requirements in the plurality of places in which the aircraft is intended to be operated; and
automatically displaying an indication of whether the remaining specification is still in compliance.

11. A method of marketing an aircraft product, said method comprising:
receiving a plurality of countries in which the aircraft is to be used and an intended mode of operation, the mode of operation being one of private and public, from a user;
automatically including all required options for the aircraft necessary to maintain compliance in all of the countries in the plurality for the mode of operation in a three-dimensionally displayed initial product specification;

allowing the user to select and deselect options in order to create a plurality of three-dimensionally displayed altered product specifications;

informing the user of whether each of the altered product specifications remain in compliance in all of the plurality of countries for the mode of operation, and notifying the user of suggestions enabling the user to return said altered product specifications in any altered product specification which is noncompliant to a compliant status;

calculating and continually displaying a total weight and a total cost for each of the altered product specifications while viewing the altered product specifications in three dimensions; and enabling the user to complete a final product specification which is compliant in all of said plurality of countries for the mode of operation so that an order for an aircraft can be made.

* * * * *